United States Patent
Cahill et al.

(10) Patent No.: US 7,357,486 B2
(45) Date of Patent: Apr. 15, 2008

(54) METHOD OF LASER MACHINING A FLUID SLOT

(75) Inventors: David Cahill, Celebridge (IE); Jeffrey R. Pollard, Corvallis, OR (US); Declan John O'Reilly, Rush (IE); Graeme Scott, Maynooth (IE); Noel McLoughlin, Celbridge (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 10/138,594

(22) Filed: May 2, 2002

(65) Prior Publication Data

US 2003/0117449 A1 Jun. 26, 2003

Related U.S. Application Data

(60) Provisional application No. 60/343,476, filed on Dec. 20, 2001.

(51) Int. Cl.
*B41J 2/04* (2006.01)
*B23K 26/00* (2006.01)

(52) U.S. Cl. ............... 347/54; 219/121.6; 219/121.76; 219/121.77

(58) Field of Classification Search ............ 347/47, 347/44, 40, 54; 216/48, 4; 29/890.1; 430/311; 219/121.6, 121.68, 121.76, 121.77
See application file for complete search history.

(56) References Cited

U.S. PATENT DOCUMENTS

| | | | |
|---|---|---|---|
| 4,587,396 A * | 5/1986 | Rubin | 219/121.78 |
| 4,746,935 A | 5/1988 | Allen | 346/140 R |
| 4,915,981 A | 4/1990 | Traskos et al. | 427/53.1 |
| 5,093,548 A | 3/1992 | Schmidt-Hebbel | |
| 5,211,806 A | 5/1993 | Wong et al. | |
| 5,266,532 A | 11/1993 | Russell et al. | 437/242 |
| 5,297,331 A * | 3/1994 | Childers | 29/611 |
| 5,322,988 A | 6/1994 | Russell et al. | 219/121.69 |
| 5,354,420 A | 10/1994 | Russell et al. | 156/643 |
| 5,362,450 A | 11/1994 | Russell et al. | 422/186.3 |
| 5,385,633 A | 1/1995 | Russell et al. | 156/693 |
| 5,387,314 A | 2/1995 | Baughman et al. | 156/643 |
| 5,441,593 A | 8/1995 | Baughman et al. | 216/27 |
| 5,455,998 A * | 10/1995 | Miyazono et al. | 29/611 |
| 5,469,199 A | 11/1995 | Allen et al. | 347/42 |
| 5,493,445 A | 2/1996 | Sexton et al. | 359/614 |
| 5,501,893 A | 3/1996 | Laermer et al. | 428/161 |
| 5,591,285 A | 1/1997 | Afzali-Ardakani et al. | 156/62.2 |

(Continued)

FOREIGN PATENT DOCUMENTS

EP 0525497 7/1992

(Continued)

OTHER PUBLICATIONS

Yoo et al. Evidence for Phase-explosion and Generation of Large Particles During High Power Nanosecond Laser Ablation of Silicon, Appl. Phys. Lett., vol. 76, No. 6 (Feb. 7, 2000) pp. 783-785.

(Continued)

*Primary Examiner*—Stephen D Meier
*Assistant Examiner*—Geoffrey Mruk

(57) ABSTRACT

A method of laser machining a fluid slot includes directing a UV laser beam towards a substrate with microelectronics to form a slot through the substrate.

25 Claims, 14 Drawing Sheets

U.S. PATENT DOCUMENTS

| | | | |
|---|---|---|---|
| 5,608,436 | A | 3/1997 | Baughman et al. |
| 5,688,715 | A | 11/1997 | Sexton et al. ............... 473/173 |
| 5,835,513 | A * | 11/1998 | Pieterse et al. ............... 372/22 |
| 5,870,421 | A | 2/1999 | Dahm ......................... 372/75 |
| 5,948,290 | A | 9/1999 | Yamamoto et al. .... 219/121.71 |
| 6,086,366 | A | 7/2000 | Mueller et al. ............... 433/29 |
| 6,284,148 | B1 | 9/2001 | Laermer et al. .............. 216/37 |
| 6,310,701 | B1 | 10/2001 | Lizotte |
| 6,481,832 | B2 * | 11/2002 | Liu et al. ...................... 347/65 |
| 2001/0045419 | A1 | 11/2001 | Dunsky et al. |
| 2002/0086544 | A1 | 7/2002 | Boyle |
| 2002/0088780 | A1 | 7/2002 | Boyle et al. |
| 2002/0170891 | A1 | 11/2002 | Boyle et al. |
| 2002/0191054 | A1 * | 12/2002 | Liu et al. ...................... 347/65 |

FOREIGN PATENT DOCUMENTS

| | | |
|---|---|---|
| EP | 000525497 A1 * | 2/1993 |
| EP | 0599595 | 11/1993 |
| EP | 0737582 | 10/1996 |
| EP | 0796695 | 3/1997 |
| EP | 1106358 | 11/2000 |
| EP | 001106358 A1 * | 6/2001 |
| JP | 62-234687 | 10/1987 |
| JP | 05318744 | 5/1992 |
| JP | 06079486 | 8/1992 |
| JP | 05-144978 | 6/1993 |
| JP | 08300667 | 5/1995 |
| JP | 10-163136 | 6/1998 |
| JP | 11-008222 | 1/1999 |
| JP | 2000246475 | 9/2000 |
| WO | WO98-20533 | 5/1998 |
| WO | WO00/50198 | 8/2000 |
| WO | WO 01/10177 | 8/2000 |
| WO | WO0103934 | 1/2001 |
| WO | WO01/10177 | 2/2001 |
| WO | WO0147715 | 7/2001 |
| WO | WO03/028949 | 10/2003 |

OTHER PUBLICATIONS

Daniel Mahoney, Laser Cutting of Silicon for Fabrication of Solar Cells http://www.unh.edu/materials-science/5_2_00.htm (May 2, 2000), (1 page).

Yoo et al. Explosive change in crater properties during high power nanosecond laser ablation of silicon, J. Appl. Phys. vol. 88, No. 3, (Aug. 1, 2000), pp. 1638-1649.

Henc-Bartolic et al., Silicon Surface Irradiated by Nitrogen Laser Radiation, FIZIKA A 6 (1997) 2, pp. 97-102.

von Allmen, Martin and Blatter, Andreas Laser-Beam Interactions with Materials, Physical Prinicples and Applications, 2d ed. (updated) 1995 pp. 131-134.

Melles Griot, Gaussian Beam Optics; Lens Selection. [Company Product Specifications found at http://www.mellesgriot.com], pp. 2.10-2.12, actual publication date is unknown.

Kobel, Lynn Press Release (http://www.lambdaphysik.com/News/press_story.asp:press_id=38). Gator Series DPSS Lasers Drill and Cut Silicon Wafers With Short Nanosecond Pulses (Feb. 23, 2001).

Kobel-Haddad, Lynn Press Release (http://www.lambdaphysik.com/News/press_story.asp:press_id=45), New PowerGator Industrial-Grade DPSS Laser—High Speed, High Quality, Micromachining of Ceramic, Silicon and Metals over 1mm Thick at 532 nm, (May 15, 2001).

Kobel-Haddad, Lynn Press Release (http://www.lambdaphysik.com/News/press_story.asp:press_id=53), Lambda PhysikGator Laser Series Receives Advanced Packaging—Wafer Dicing Award at Semicon West 2001 (Aug. 3, 2001).

RESONETICS Laser Material Processing Solutions for Industry: http://www.resonetics.com/industry.htm, actual publication date is unknown.

RESONETICS Illustrated Guide to Laser Applications in Micromachining—Polymers and Plastics, http://www.resonetics.com/applications.htm, pp. 1-2, actual publication date is unknown.

RESONETICS Precision Fl w and Laser Micromachining—Engineer's Guide to Laser Micromachining—Precision Flow Devices, http://www.resonetics.com/precision.htm, pp. 1-5, actual publication date is unknown.

RESONETICS Laser Micro-machining Technology—Technology Matching, http://www.resonetics.com/matching.htm, pp. 1-2, actual publication date is unknown.

Press Release High Quality Micro-Drilling and Cutting in Silicon Using Innovative Lasers (Mar. 30, 2000).

Japanese Unexamined Patent Application (Kokai) No. Sho 63-13334, Application No. 61-156100, Filing Date Jul. 4, 1986, Hitachi, Ltd, "Dry Etching Technique," published Jan. 20, 1988 with English translation.

"Lens Selection, XP-00133847", Melled-Griot Catalog.

Mandler, J., "A Printing Solution For A Multimedia Environment", Hewlett-Packard Journal, Hewlett-Packard Co. Palo Alto US, vol. 45, No. 2, Apr. 1, 1994.

WO Search Report, Apr. 23, 2003.

* cited by examiner

US 7,357,486 B2

METHOD OF LASER MACHINING A FLUID SLOT

REFERENCE TO RELATED APPLICATION

This application claims the benefit of U.S. Provisional Application Ser. No. 60/343,476, filed on Dec. 20, 2001.

FIELD OF THE INVENTION

The present invention relates to methods of laser machining a fluid slot.

BACKGROUND OF THE INVENTION

Various inkjet printing arrangements are known in the art and include both thermally actuated printheads and mechanically actuated printheads. Thermal actuated printheads tend to use resistive elements or the like to achieve ink expulsion, while mechanically actuated printheads tend to use piezoelectric transducers or the like.

A representative thermal inkjet printhead has a plurality of thin film resistors provided on a semiconductor substrate. An orifice and/or a barrier layer is provided on the substrate. The orifice and/or the barrier layer defines firing chambers about each of the resistors, an orifice corresponding to each resistor, and an entrance to each firing chamber. Actuation of a heater resistor by a "fire signal" causes ink in the corresponding firing chamber to be heated and expelled through the corresponding orifice.

Ink typically is provided at the entrance of the firing chamber through a feed slot that is machined in the semiconductor substrate. The substrate usually has a rectangular shape, with the slot disposed longitudinally therein. Resistors are often arranged in rows located on one or both sides of the slot. The width of the print swath achieved by one pass of a printhead is approximately equal to the length of the resistor rows, which in turn is approximately equal to the length of the slot.

Feed slots have typically been formed by sand drilling (also known as sandblasting or "sand slotting"). This method is a rapid, relatively simple and scalable process. The sand blasting method is capable of forming an opening in a substrate with a relatively high degree of accuracy for simple slot shapes, while generally avoiding substantial damage to surrounding components and materials. Also, it is capable of cutting openings in various substrates having different materials without the generation of excessive heat. Furthermore, it allows for improved relative placement accuracies during the production process.

While sand slotting affords these apparent benefits, sand slotting is also disadvantageous in that it may cause microcracks in the semiconductor substrate that significantly reduce the substrate's fracture strength, resulting in significant yield loss due to cracked die. Low fracture strength also limits substrate length which in turn adversely impacts print swath height and overall print speed. In addition, sand slotting typically causes chips to the substrate on both the input and output side of the slot. Normally the chipping is tens of microns large and limits how close the firing chamber can be placed to the edge of the slot. Occasionally the chipping is larger and causes yield loss in the manufacturing process. The chipping problem is more prevalent as the desired slot length increases and the desired slot width decreases.

Feed slots may also be formed by wet chemical etching with, for example, alkaline etchants. Such etching techniques result in etch angles that cause a very wide backside slot opening. The wide backside opening limits how small a particular die on the wafer could be and therefore limits the number of die per wafer (the separation ratio). It is desired to maximize the separation ratio.

SUMMARY

In one embodiment, a method of laser machining a fluid slot includes directing a UV laser beam towards a substrate with microelectronics to form a slot through the substrate.

DETAILED DESCRIPTION

Figure 1:
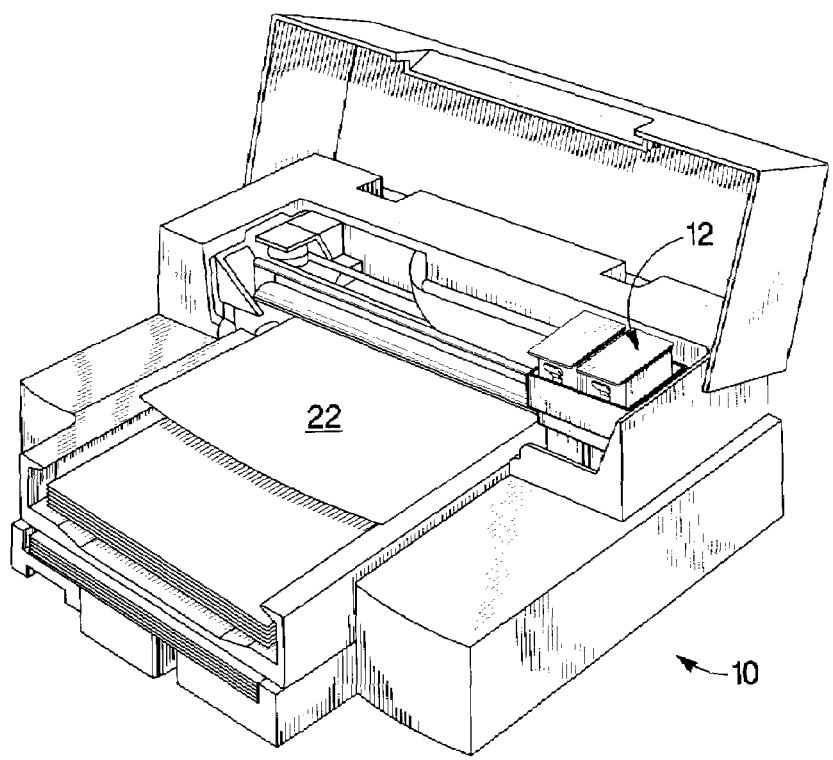
FIG. 1 illustrates a perspective view of an embodiment of a printer of the present invention.
Figure 2:
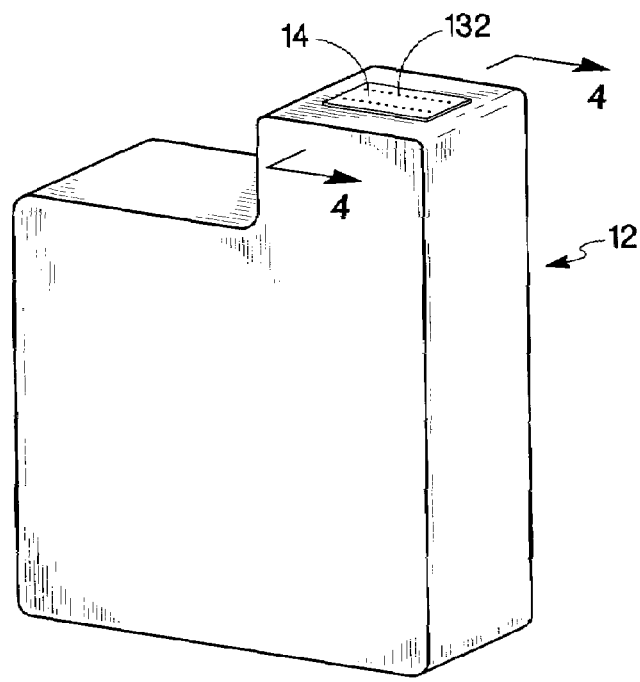
FIG. 2 illustrates a perspective view of an embodiment of a print cartridge of the present invention.

FIG. 1 is a perspective view of a printer 10 for printing on media 22 with a print cartridge (or ejection cartridge) 12. FIG. 2 is a perspective view of the cartridge 12 with a printhead (or fluid drop generator or fluid ejection device) 14 of an embodiment of the present invention. Fluid or ink is ejected or fired out from nozzles 132 to the media 22.

Figure 3:
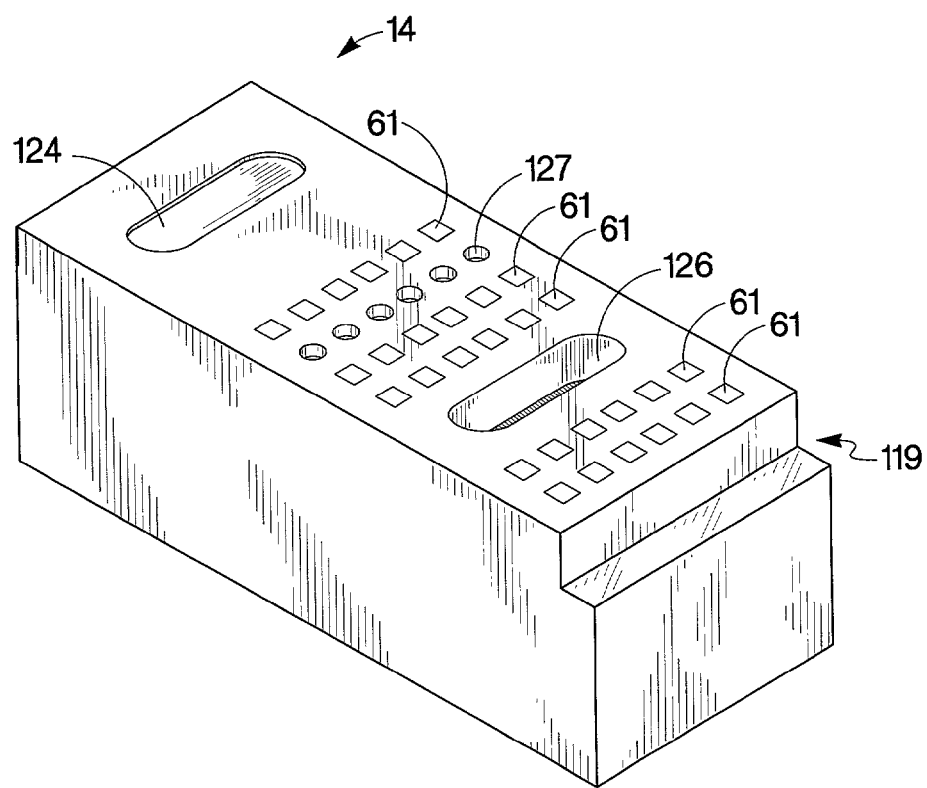
FIG. 3 illustrates a perspective view of one embodiment of a printhead.

FIG. 3 illustrates an enlarged view of one embodiment of the printhead 14 in perspective view. The printhead 14 in this embodiment has multiple features, including an edge step 119 for an edge fluid feed to resistors (or fluid ejectors) 61. The printhead also has a trench 124 that is partially formed into the substrate surface. A slot (or channel) 126 for a slot fluid feed to resistors 61, and/or a series of holes 127 feeding fluid to resistors 61 are also shown on this printhead, each being formed by a UV laser machining process as described herein. The trench 124 may also be formed by the UV laser machining processes as described further below. In one embodiment there are at least two of the features described on the printhead 14 in FIG. 3. For example, only the feed holes 127 and the slot 126 are formed in the printhead 14, where in an alternative embodiment the edge step and/or the trench 124 are formed as well. In another example, the edge step 119, and the slot 126 are formed in the printhead 14, where in an alternative embodiment the trench 124 and/or the feedholes 127 are formed as well.

Figure 4:
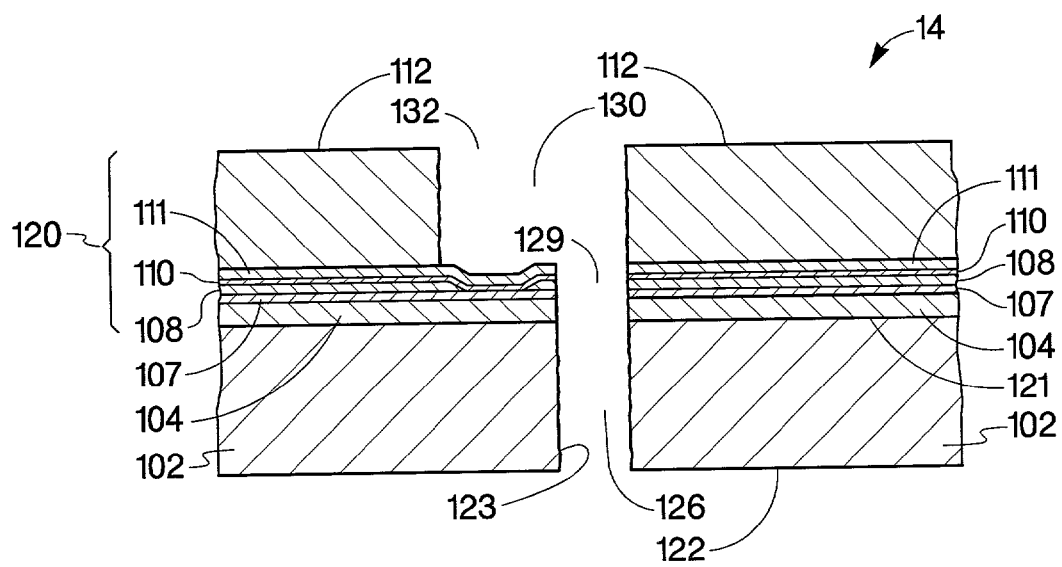
FIG. 4 illustrates a cross-sectional view of an embodiment of a printhead of FIG. 2.

FIG. 4 illustrates a cross-sectional view of the printhead 14 of FIG. 2 where the slot 126 having slot (or side) walls 123 is formed through a substrate 102. The formation of the slot through a slot region (or slot area) in the substrate is described in more detail below. In another embodiment, a higher density of slots is etched in a given die. For example, the inter slot spacing or spacing between adjacent slots in the die or substrate are as low as 10 microns. (In an embodiment, 10 microns is just over twice the extent of a heat affected zone for each slot, where the heat affected zone is the area along the slot walls that is affected by the laser machining described in this application.)

In FIG. 4, a thin film layer (or an active layer, a thin film stack, an electrically conductive layer, or a layer with micro-electronics) 120 that is formed or deposited on a front or first side (or surface) 121 of the substrate 102 is illustrated. The first side 121 of the substrate is opposite a second side (or surface) 122 of the substrate 102. The thin film stack 120 is at least one layer formed on the substrate, and, in a particular embodiment, masks at least a portion of the first side 121 of the substrate 102. Alternatively or additionally, the layer 120 electrically insulates at least a portion of the first side 121 of the substrate 102.

As shown in the embodiment of the printhead shown in FIG. 4, the thin film stack 120 includes a capping layer 104, a resistive layer 107, a conductive layer 108, a passivation layer 110, a cavitation barrier layer 111, and a barrier layer 112, each formed or deposited over the first side 121 of the substrate 102 and/or the previous layer(s). In one embodiment, the substrate 102 is silicon. In various embodiments, the substrate is one of the following: single crystalline silicon, polycrystalline silicon, gallium arsenide, glass, silica, ceramics, or a semiconducting material. The various materials listed as possible substrate materials are not necessarily interchangeable and are selected depending upon the application for which they are to be used. In this embodiment, the thin film layers are patterned and etched, as appropriate, to form the resistors 61 in the resistive layer, conductive traces of the conductive layer, and a firing chamber 130 at least in part defined by the barrier layer. In a particular embodiment, the barrier layer 112 defines the firing chamber 130 where fluid is heated by the corresponding resistor and defines a nozzle orifice 132 through which the heated fluid is ejected. In another embodiment, an orifice layer (not shown) having the orifices 132 is applied over the barrier layer 112. An example of the physical arrangement of the barrier layer, and thin film substructure is illustrated at page 44 of the Hewlett-Packard Journal of February 1994. Further examples of ink jet printheads are set forth in commonly assigned U.S. Pat. No. 4,719,477, U.S. Pat. No. 5,317,346, and U.S. Pat. No. 6,162,589. In an alternative embodiment, at least one layer or thin film layer is formed or deposited upon the substrate 102. Embodiments of the present invention include having any number and type of layers formed or deposited over the substrate (or no layers at all), depending upon the application for which the slotted substrate is to be utilized.

In the embodiment shown in FIG. 4, a channel 129 is formed as a hole or fluid feed slot 129 through the layers (120) formed upon the substrate. The channel 129 fluidically couples the firing chamber 130 and the slot 126, such that fluid flows through the slot 126 and into the firing chamber 130 via channel 129. In the particular embodiment shown, the channel entrance 129 for the fluid is not in the center of the slot 126. However, the slotted substrate is formed as described below substantially the same in either instance where the entrance 129 is centrally located or off-center.

Figure 4A:
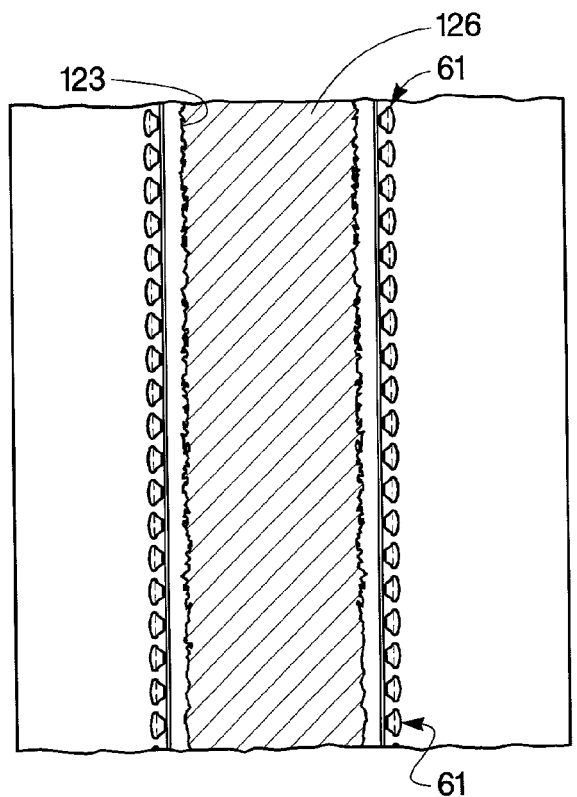
FIGS. 4A and 4B illustrate plan and perspective views of the printhead of FIG. 2.
Figure 4B:
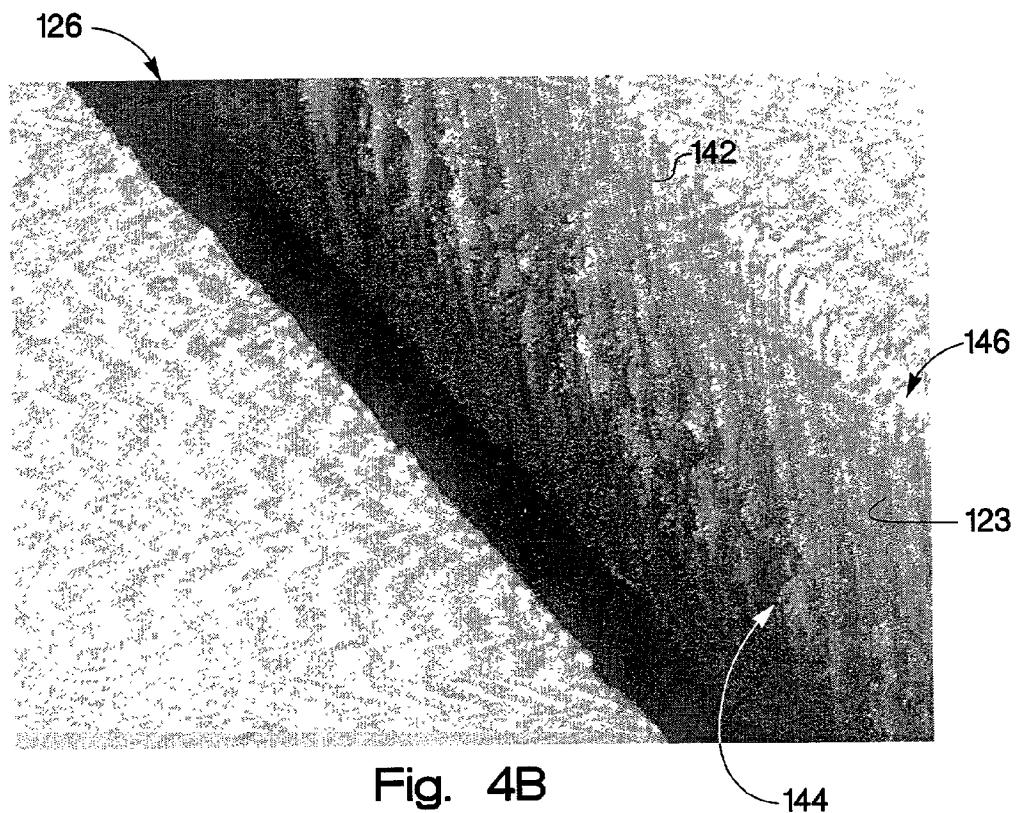

In the embodiment illustrated in FIGS. 4A and 4B, a plan and a perspective view of the printhead 14 and its slot 126 is shown without the barrier layer 112 (for FIG. 4A) and without the stack 120 (for FIG. 4B). As shown in the embodiment of FIG. 4A, the resistors 61 are along the slot 126. As shown in the embodiment of FIG. 4B, the slot wall 123 has striations (or vertical lines) 142, and a rough area (or breakthrough area) 144 near the middle of the slot 126 formed by the slotting process of the present invention. The rough area 144 is formed by a breakthrough near the middle of the slot 126. The bending moment is minimized at this mid-slot location compared with a slot surface location, and therefore there is less stress on the breakthrough-rough area 144 during processing. As a result, cracking is minimized at the breakthrough-rough area 144, and thus throughout the substrate 102. Accordingly, slots formed by an embodiment of the present invention have chip sizes along the surfaces of the substrate of at most 3 microns, if any.

Also as shown in FIGS. 4A and 4B, the slot 126 has a wall edge 146. In one embodiment, the roughness (or smoothness) of the wall edge 146 along the front side 121 of the substrate is about 3 microns, and about 5 microns along the second side 122 of the substrate, although in the embodiment the roughness could be more or less.

Figure 5A:
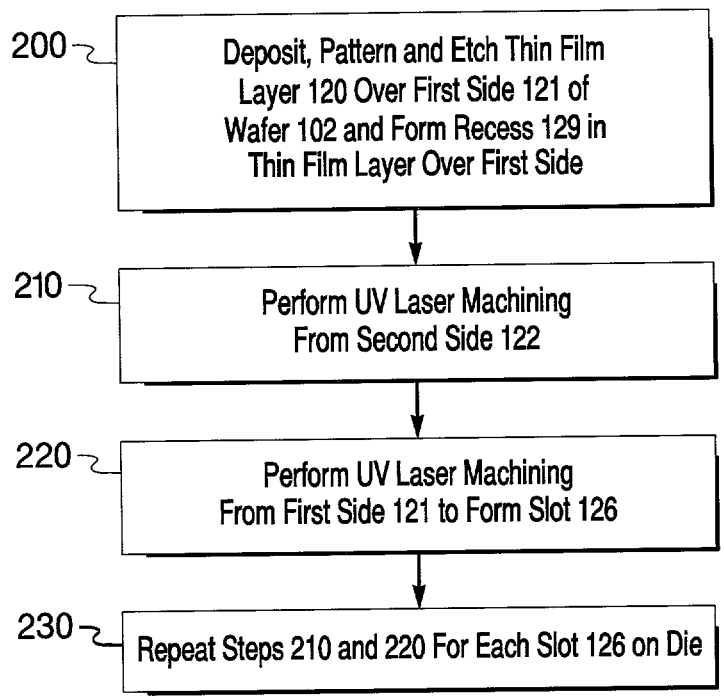
FIGS. 5A to 5E illustrate process flow charts for several alternative embodiments of the manufacturing process for forming a slotted substrate according to the present invention.
Figure 6A:
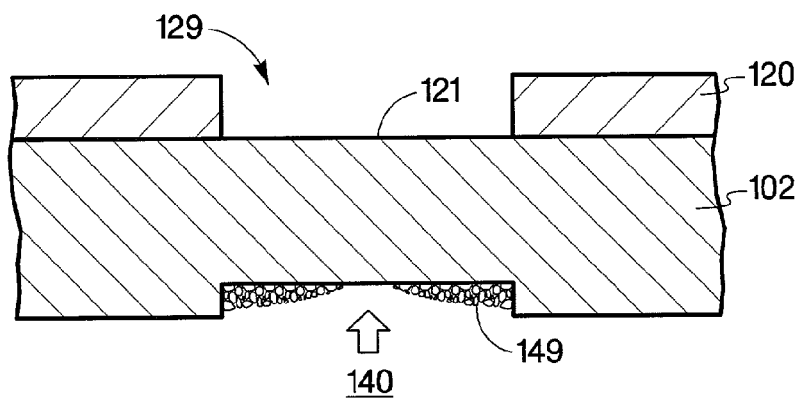
FIGS. 6A to 6B illustrate one embodiment of steps toward forming the slotted substrate shown in profile.

In the embodiment described in the flow chart of FIG. 5A at step 200, the thin film layer or stack 120 is formed, masked and patterned over the first side 121 of the wafer or substrate 102 to form the recess 129, as shown in FIG. 6A. In one embodiment (not shown), a hard mask and/or a photoimagable material layer are additionally formed on the backside 122 of the substrate opposite the thin film layer 120. At step 210, the slot formation is begun using a UV laser beam 140 (See FIG. 6A) directed to an area of the substrate to be slotted. In this embodiment, an area on the second side 122 of the substrate is the initial area to be exposed to the UV laser beam. The substrate material in the area of the substrate that is exposed to the UV laser beam is ablated and/or vaporized to form the slot 126, as described in more detail below.

Figure 6B:
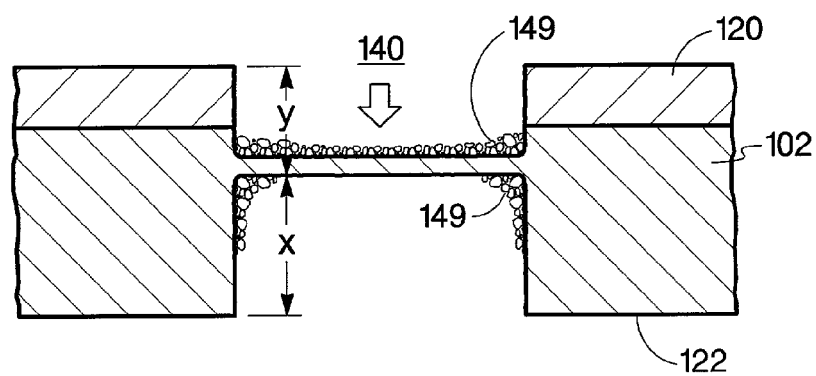

As shown in FIGS. 6A & 6B, debris or residue 149 from the laser machining begins to form along the slot walls 123 as well as along the bottom of the trench being formed in the substrate. In alternative embodiments, the debris may be formed of polycrystalline and/or amorphous silicon oxide. As shown in the embodiment of FIG. 6B, at the end of step 210, the substrate 102 is laser machined to a depth x.

At step 220, the laser beam 140 is directed towards the first side or surface 121 of the substrate through the recess in the thin film stack 120, as shown in FIG. 6B. The slot is completed by UV laser machining through the substrate to the depth y, where depth x is greater than depth y, where x+y=substrate depth. In a first embodiment, y is about 20 microns. In a second embodiment, x is about twice y. In a third embodiment, x is about the same as y. In yet another embodiment, y is greater than x.

At step 230 of FIG. 5A, steps 210 and 220 are repeated for each slot 126 in the die (or substrate). In the embodiment shown and described with regard to FIGS. 6A and 6B, throughput is improved with the described bi-directional process because the debris (or redeposited material) 149 escapes the machined channel more readily in shallower rather than deeper trenches. Further, in embodiments where x is greater than y, the majority of the debris that escapes the machined channels escapes from the backside 122, thereby limiting the amount of contamination to the active layer(s) 120 on the front side 121 of the substrate. In another method, the UV laser etch is performed first from the first side 121, and then from the second side 122 to meet at the breakthrough area 144.

In this embodiment, the laser machining is provided by a UV laser beam 140 (FIG. 6A), and in one particular embodiment, is provided by a diode-pumped solid-state pulsed UV laser. In another particular embodiment, the UV laser 140 originates from a Xise 200 Laser Machining Tool, manufactured by Xsil of Dublin, Ireland. A laser source 139 (shown in FIGS. 9A and 9B) uses power in the range of about 2 to 100 Watts, and more particularly about 4.5 Watts. The laser beam has a wavelength of (1060 nm)/n or (1053 nm)/n, where n=2, 3 or 4. In a specific embodiment, the UV wavelength is less than about 400 nm, in particular about 355 nm. The pulse width of the laser beam is about 15 ns in this embodiment, and the repetition rate is about 30 kHz. The laser beam has a diameter of about 5 to 100 microns, and more particularly about 30 microns in this embodiment. In an embodiment that is not shown here, the laser-machining tool of the present invention has a debris extraction system to remove the debris 149 resulting from the laser machining.

In an embodiment of the present invention, the intense UV light is absorbed into less than about 1 micron of the surface of the material being ablated. Because the light energy is so concentrated near the surface of the material, the material rapidly heats, melts, and vaporizes. A mixture of vapor and molten droplets are then quickly ejected away. Consequently, the surrounding region (or heat affected zone) is not melted substantially or otherwise substantially damaged because the process happens so quickly, and there is not enough time for significant heat to propagate to the surrounding regions. A more in depth explanation of the process is described on pps. 131-134 of *Laser-Beam Interactions with Materials: Physical Principles and Applications*, 2nd updated edition, 1995, written by Martin von Allmen & Andreas Blatter.

Figure 6C:
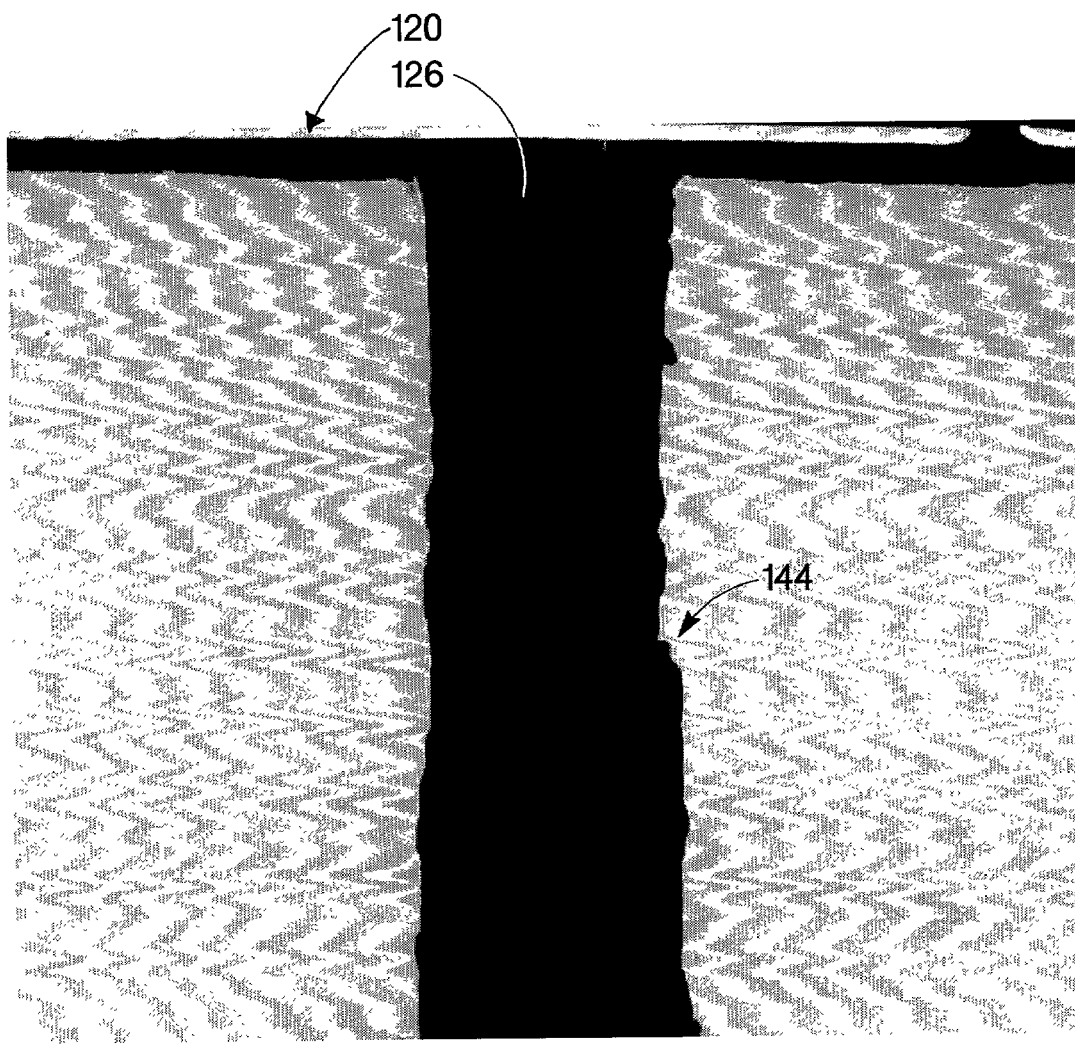
FIG. 6C illustrates one embodiment of the slotted substrate shown in profile and formed via steps shown in FIGS. 6A to 6B.
Figure 6D:
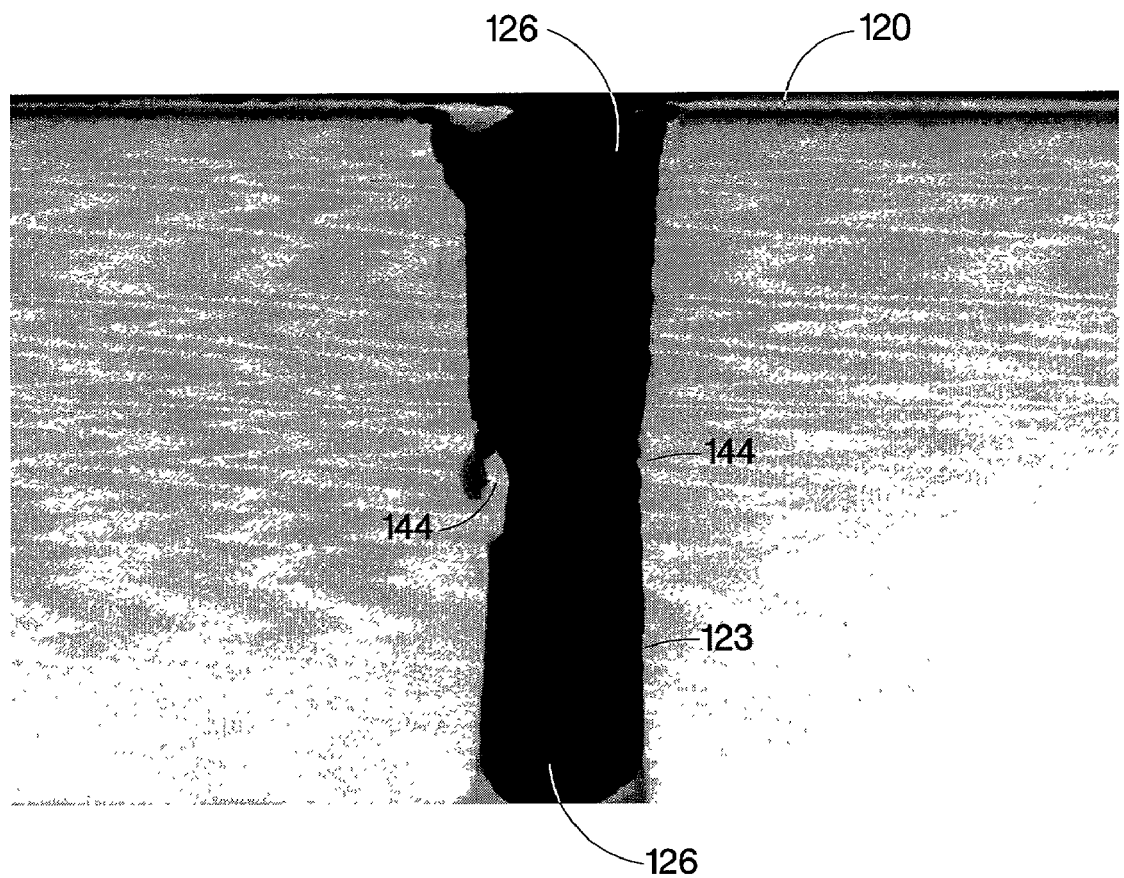
FIG. 6D illustrates another embodiment of the slotted substrate shown in profile and formed via steps shown in FIGS. 6A to 6B.

In the laser machining process of the current invention, smoother and more precise slot profiles are attainable because the laser machining is so localized. Accordingly, slots formed by embodiments of the present invention again have surface roughness of at most 5 microns. However, when the laser machine breaks through the substrate, and the slot 126 is formed, there is likely to be the rough area or rough spot 144 near the breakthrough point, as shown in the embodiments of the slot profiles of FIGS. 6C and 6D. In these embodiments, the rough area 144 near the center of the slot is redeposited material caused by heated fragments that were not efficiently extracted due to the depth of the trench. These fragments subsequently melted and resolidified to form the debris 149.

Figure 5B:
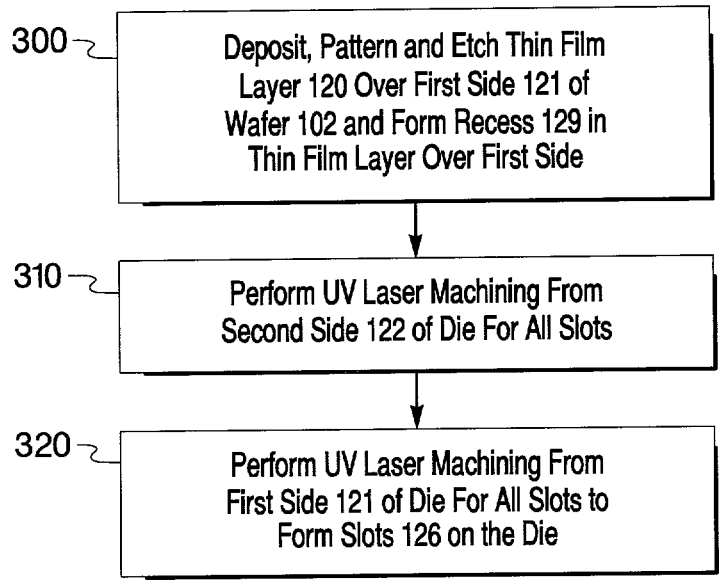

As depicted in FIG. 5B, step 300 is similar to step 200 of FIG. 5A. Steps 310 and 320 can be considered similar to steps 210 and 220 of FIG. 5A, however, some differences are as follows. First in step 310, each slot on the die is partially formed from the second side 122. Then each partially formed slot is completed when the laser beam is directed towards the first side 121 in step 320. In other words, no repetition of previous steps occurs in this embodiment. In one embodiment, a beam splitter is used to partially form slots from the second side in step 310 and/or is used to complete slotting from the first side in step 320, wherein the beam splitter is discussed in more detail below with regard to FIGS. 8A and 8B. In an alternative embodiment, the first side 121 is subjected to the laser machining process before the second side 122 thereby reversing steps 310 and 320.

Figure 5C:
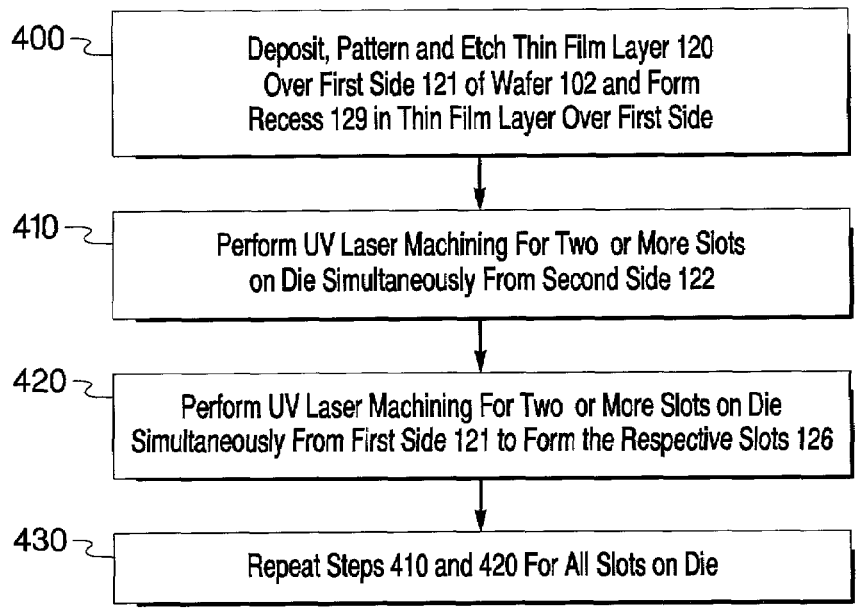

As depicted in FIG. 5C, step 400 is similar to step 200 of FIG. 5A. In step 410, two or more slots on the die or wafer are partially formed simultaneously from the second side 122 of the die. In step 420, those two or more slots 126 are fully formed simultaneously from the front side 121. Steps 410 and 420 are repeated until each of the slots are formed in step 430. In one embodiment, two or more slots are formed in step 420, or partially formed in step 410, simultaneously through use of the beam splitters discussed below. In an alternative embodiment, the first side 121 is subjected to the laser machining process before the second side 122 thereby reversing the steps 410 and 420.

In another embodiment, the concepts of FIGS. 5B and 5C can be combined such that two or more slots are partially formed simultaneously from the second side 122. Then, each slot on the die is partially formed from the second side (in groups of two or more slots simultaneously) before any of the slots are fully formed by laser machining from the front side of the die (in groups of two or more slots simultaneously). In an alternative embodiment, the first side 121 is subjected to the laser machining process before the second side 122.

Figure 5D:
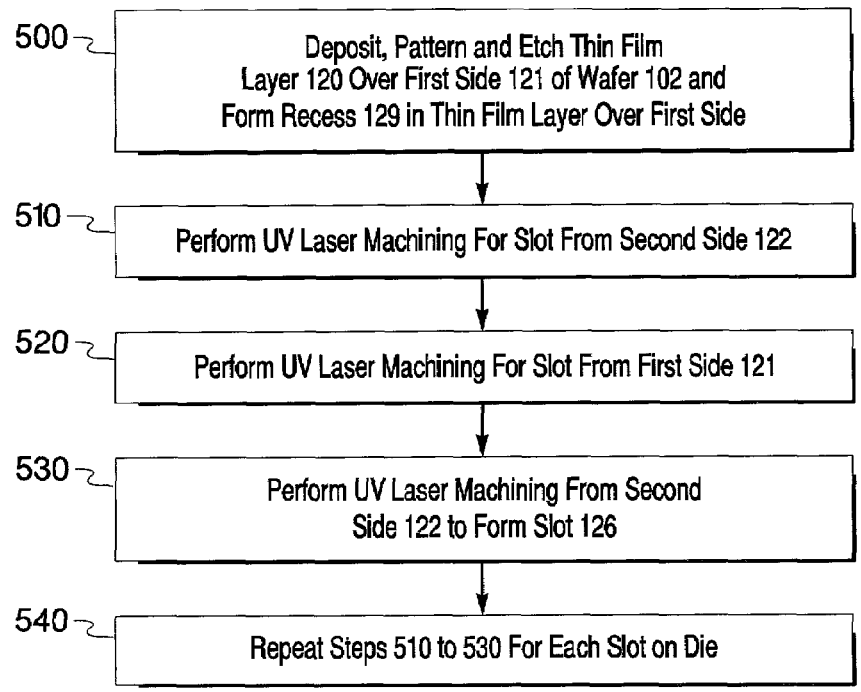

As depicted in FIG. 5D, steps 500, 510 and 520 are similar to steps 200, 210 and 220 of FIG. 5A, with some differences as follows. The slot is laser-machined from the second side in step 510, and then laser-machined from the first side of the substrate in step 520. After the slot is laser-machined from both sides, the slot is still not yet fully formed in that the laser machining has not fully broken through the substrate 102, as opposed to be completely formed after step 220. In step 530, the partially formed slot is laser machined from the second side again, until breakthrough occurs. In step 540, steps 510 to 530 are repeated for each slot on the die. As an alternative to step 540, step 510 is performed for each partially formed slot on the second side, then step 520 is performed for each partially formed slot on the first side, and then step 530 is performed for each partially formed slot on the second side until breakthrough occurs. In another alternative embodiment, the first side is partially laser machined, then the second side is partially laser machined, and then ultimate breakthrough occurs from the first side.

Figure 5E:
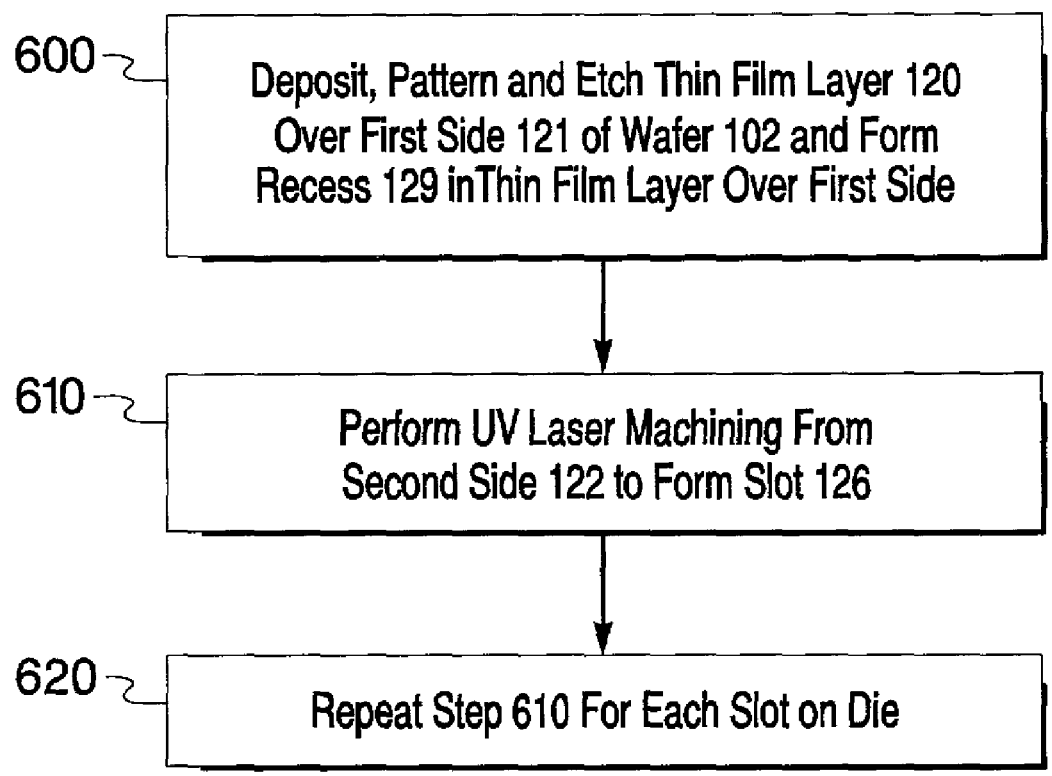

As depicted in FIG. 5E, steps 600 and 610 are similar to step 200 and 210 with some differences as follows. After step 610 is performed, the laser machining from the second side breaks all the way through to the first surface of the substrate. In step 620, the step 610 is repeated for each slot 126 to be formed in the die. In an alternative embodiment that is not shown, the barrier layer 112 is formed with the thin film stack 120 over the first side 121 of the substrate in step 600. In another alternative embodiment, step 600 is performed after step 620 is completed. In another alternative embodiment, the UV laser machining of the slot is fully performed from the first side 121 of the substrate.

FIGS. 6E to 6L illustrate various embodiments of a slot profile in a substrate 102. In the embodiments shown, the slot profile is not to scale. Generally, the slot profile is narrower than as depicted. The slot profiles are depicted in these drawings as wider than in general for ease of viewing the distinctions in the slot profiles. The substrate 102 is illustrated in these embodiments as having active layer (or layer with microelectronics) 120 on a first side of the substrate. However, in alternative embodiments, the active layer(s) 120 is on the second side of the substrate. In each of these embodiments shown, the slot profile is formed by one of the laser machining process described above, including a bi-directional laser machining process.

Figure 6E:
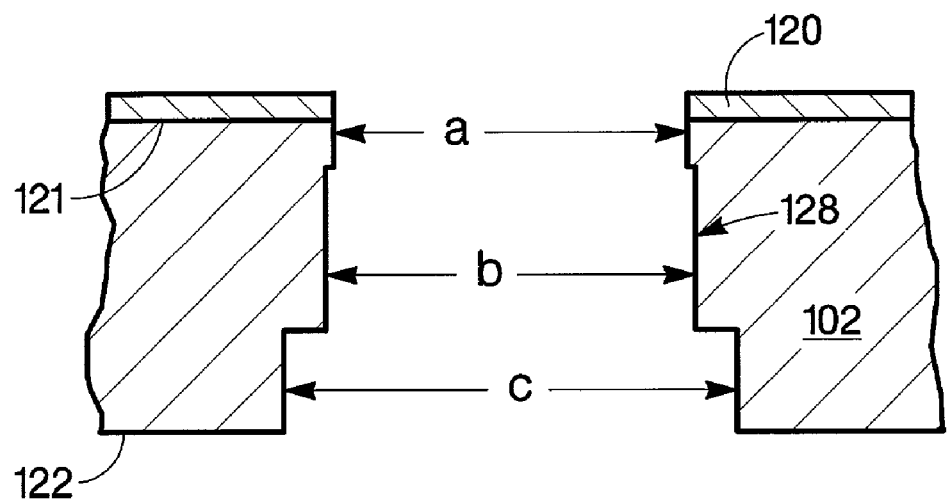
FIGS. 6E to 6L illustrate various embodiments of slot profiles for the present invention.

FIG. 6E illustrates an embodiment of the slotted substrate 102 having stepped slot walls 128. The slot walls 128 of FIG. 6E have varying cross-sectional areas that incrementally decrease from the second surface 122 to the first surface 121. In the illustrated embodiment, there are two steps and three varied cross-sectional areas associated with three slot widths a, b, and c. The slot width a is adjacent the first surface 121, the slot width c is adjacent the second surface 122, and the slot width b is in between a and c. In the embodiment shown, the slot width a is 210 microns, the slot width b is 220 microns, and the slot width c is 260 microns. In an alternative embodiment, the slot width near the first surface is in a range of about 5 to 100 microns, and the slot width near the second surface is in a range of about 100 to 300 microns, where the slot width near the second surface is greater than that of the first surface. In particular, the width near the second surface is at least 10% greater than that of the first surface. For example, the slot width near the second surface is about 140 microns, while the slot width near the first surface is about 50 microns.

In the embodiment shown in FIG. 6E, the slot profile is formed as follows: the slot widths b and c are formed from the second side 122, then the slot width a is formed from the first side 121. In another embodiment, each of the slot widths are consecutively formed from the second side 122. In a first embodiment, the slot width a is formed, then slot width b, then slot width c. In a second embodiment, the slot width c is formed, then slot width b, then slot width a. However, various other embodiments are envisioned, including forming slot width b, then slot width c, then slot width a, especially when using bi-directional laser machining processes.

The stepped slot walls of the embodiment shown in FIG. 6E are formed by tracing the laser beam in a particular pattern over the particular side of the substrate. For example, FIG. 7E illustrates an embodiment where laser beams are traced in a multiple cookie-cutter pattern 156 to form the slot 126. In this embodiment, the laser beams traced are substantially concentric elliptical shapes: shapes m, n, and p, where shape m is the smallest elliptical shape, and shape p is the largest elliptical shape as shown in FIG. 7E. In the embodiment described with respect to FIG. 6E, the shapes n and p are traced first, then the shape m is traced, where the shape m corresponds to the slot width a, the shape n corresponds to the slot width b, and the shape p corresponds to the slot width c. Other orders of tracing are envisioned with alternate embodiments of this invention. Additional embodiments of laser beam tracing patterns are illustrated in and described with respect to FIGS. 7A to 7F.

Figure 6F:
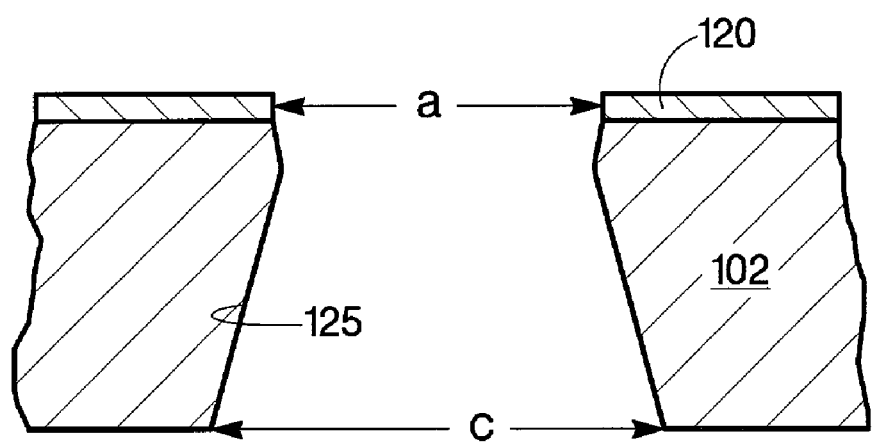

FIG. 6F illustrates an embodiment of the slotted substrate 102 having substantially tapered and smoothed slot walls 125. The slot walls 125 of FIG. 6F have varying cross-sectional areas and incrementally decrease from the second surface 122 to the first surface 121. In the embodiment shown, as the slot profile approaches the first surface 121, the slot profile narrows and then expands slightly to the first surface 121. Because the slot profile narrows and expands near the first surface in this embodiment, there is a non-symmetrical hourglass shape with respect to the first and second surfaces of the substrate. The slot width adjacent the first surface is labeled as a. The slot width adjacent the second surface is labeled as c. The slot widths a and c of FIG. 6F are similar to the slot widths of FIG. 6E.

In one embodiment, the slot walls 125 are formed by the method described with respect to FIGS. 6A and 6B. When the substrate is laser-machined from the second side, and then laser-machined from the first side, the breakthrough area of the slot has the narrower cross-sectional area as described above and shown in FIG. 6F.

In another embodiment, the slot walls 125 of FIG. 6F are formed by first forming the slot profile shown in FIG. 6E. In this embodiment, the stepped slot walls 128 are then smoothed out to form the tapered walls 125 of FIG. 6F. Methods of smoothing are discussed in more detail below. In an alternative embodiment, the smoothed out walls have a slight curvature. In another embodiment, the slot profile tapers from the second surface 122 to the first surface 121 without the narrow cross-sectional area in the slot profile.

Figure 6G:
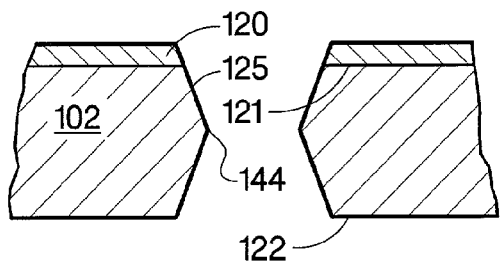

FIG. 6G illustrates an embodiment of the slot profile having a substantially hourglass-type shape, where the narrowing section 144 near the middle is formed when the breakthrough in the silicon occurs. The slot has tapered walls 125 that taper towards the middle of the slot from both the first and second surfaces of the substrate 102. This embodiment is generally formed with the bi-directional fluid slot formation described above with respect to flow chart FIG. 5A.

Figure 6J:
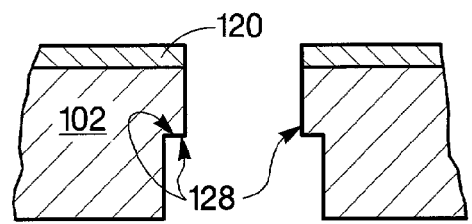
Figure 6H:
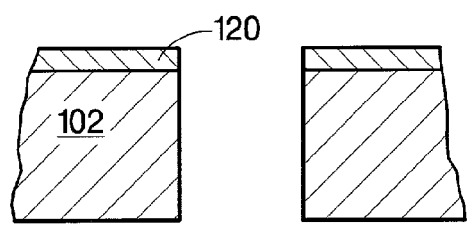

FIG. 6H illustrates an embodiment of the slot profile having substantially straight slot walls. These slot walls are formed using the smoothing methods described below. In one embodiment, these walls are formed by one of the methods described above.

Figure 6K:
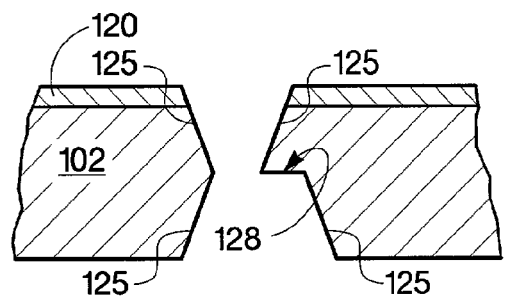
Figure 6I:
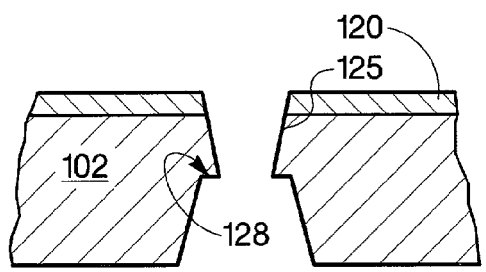

FIG. 6I illustrates an embodiment of the slot profile having a compound slot shape. FIG. 6I illustrates a slot profile having an hourglass-type shape with a counterbore in the second surface. The embodiment of the slot profile of FIG. 6I has wall surfaces 125 tapering from each substrate surface, as well as wall surfaces 128 that are stepped, i.e. orthogonal to the direction of the laser beam, forming the counterbore. In one embodiment, these walls 125 and 128 are formed by at least one of the methods described herein.

FIG. 6J illustrates another embodiment of the slot profile having a compound slot shape. FIG. 6J illustrates a slot profile with a counterbore having a stepped wall 128. FIG. 6J is similar to the embodiment described with respect to FIG. 6E, except FIG. 6J has only one step in the slot profile. The methods for forming FIG. 6E and other methods for forming slot walls described herein apply, as appropriate, to this current embodiment shown in FIG. 6J.

FIG. 6K illustrates an embodiment of the slot profile having a compound slot shape. FIG. 6K illustrates a slot profile having an hourglass-type shape with an offset counterbore. The embodiment of the slot profile of FIG. 6K has one slot wall with tapered surfaces 125 as shown and described with respect to FIG. 6G, as well as one slot wall with a stepped surface 128 and a tapered surface 125 as shown and described with respect to FIG. 6I. In one embodiment, these walls are formed by at least one of the methods described herein.

Figure 6L:
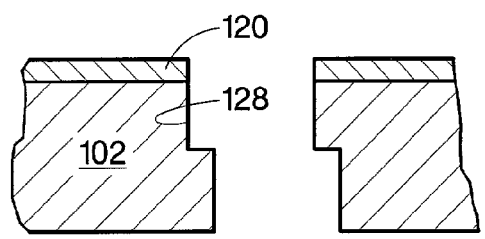

FIG. 6L illustrates another embodiment of the slot profile having a compound slot shape. FIG. 6L illustrates a slot profile with offset counterbores having stepped walls 128. In the embodiment shown, the stepped walls on each side of the slot shift over in the same direction such that the cross-sectional area at substantially all points along the slot profile remains substantially the same. In one embodiment, these walls are formed by at least one of the methods described herein.

FIGS. 7A to 7F illustrate various embodiments of laser beam patterns, including laser beam trace spacing. The laser beams are directed toward a slot area on either (or both) the first surface 121 and the second surface 122 in forming the slotted substrates of the present invention. The applied laser beam patterns determine the slot areas, and thus, the slot shapes on the substrate surfaces. In a particular embodiment, a laser beam pattern is repeatedly applied to the substrate in forming the fluid feature. In another embodiment, multiple laser beam patterns are applied to the substrate in forming the fluid feature. In a first embodiment, the slot area on each side/surface of the substrate is about 260 microns×8480 microns. In a second embodiment, the slot area on the first surface is about 210 microns×8480 microns, and about 260 microns×8480 microns on the second surface. In alternative embodiments, the slot widths are as narrow as 5 to 10 microns, and as wide as 300 microns. In more particular embodiments, the slot widths are 30-50 microns or 80 microns, depending upon the application of the fluid slot. In most embodiments, having a low aspect ratio increases the laser machining speed, due to debris interference associated with high aspect ratio features. In a particular embodiment, where slot widths as narrow as 5 to 10 microns are desired, debris accumulation along the slot walls is much greater than slot widths of greater than about 80 microns.

Figure 7A:
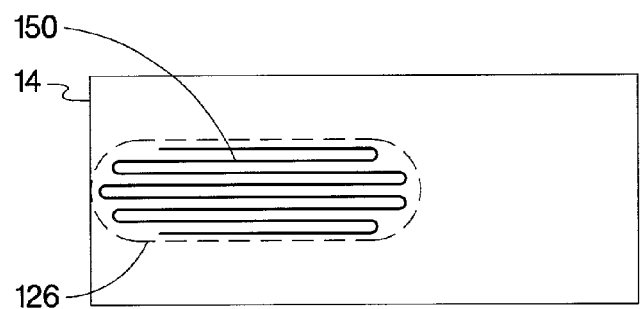
FIGS. 7A to 7F illustrate various embodiments of laser beam patterns directed to a slot area on substrate surfaces in forming the slotted substrate of the present invention.

FIG. 7A illustrates an embodiment where laser beams are traced in a raster or serpentine pattern 150 to form the slot 126 in the printhead 14. In the embodiment shown, the laser beams are traced starting at one end of the slot area, then traced back and forth in the longitudinal direction until reaching the opposite longitudinal end of the slot. As shown in this embodiment, the spacing between adjacent laser beam traces is substantially constant.

Figure 7B:
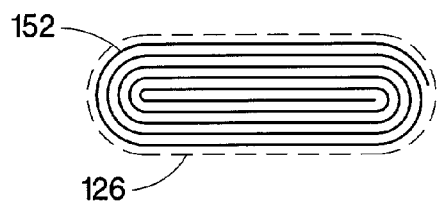

FIG. 7B illustrates an embodiment where laser beams are traced in a substantially spiral pattern 152 to form the slot 126. The laser beams are traced starting at the center of the slot and move in a circular pattern gradually increasing in size to form the slot 126 shape. In an alternative embodiment, the laser beams are traced starting along the edges of the desired slot shape and gradually decreasing in size while moving in a substantially circular pattern.

Figure 7C:
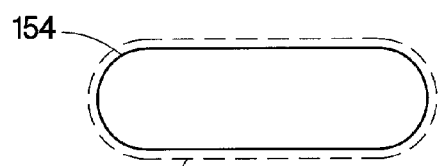

FIG. 7C illustrates an embodiment where laser beams are traced in a cookie cutter pattern 154 to form the slot 126. In the embodiment shown, the laser beams are traced along the edges of the desired slot shape of the slot 126.

Figure 7D:
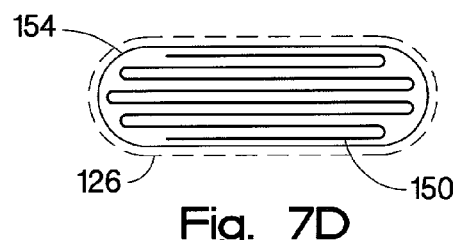
Figure 7E:
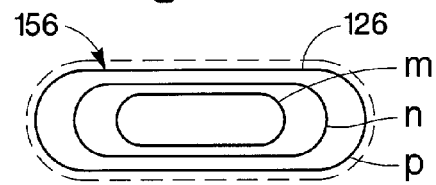

FIG. 7D illustrates an embodiment where laser beams are traced in a cookie cutter pattern 154, as described and shown with respect to FIG. 7C, as well as the raster pattern 150, as described and shown with respect to FIG. 7A, to form the slot 126. Either pattern 150 or 154 is traced first.

The embodiment of FIG. 7E for forming a slot using the multiple cookie-cutter laser beam pattern 156 has previously been described. In an alternative embodiment, there are a plurality of traces in the cookie-cutter laser beam pattern, such as two traces, or as many as practically possible. For embodiments such as those shown in FIG. 6E, the laser beam traces become successively smaller (or larger), and successive laser beams are directed to a lower (or higher) depth in the substrate. As the number of successive laser beam traces (that vary in size and depth slightly from the last) increase, the slot walls increasingly become smoother.

Figure 7F:
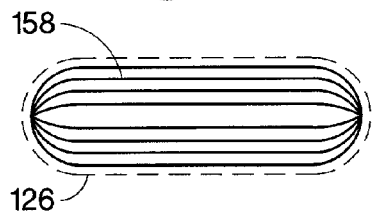

FIG. 7F illustrates an embodiment where laser beams are traced in a modified window pattern 158 to form the slot 126. In the embodiment shown, the laser beam is traced in a closed loop within the edges of the desired slot shape of the slot 126. In a first embodiment each consecutive laser beam trace is larger than the previous closed loop. In a second embodiment, each consecutive laser beam trace is smaller than the previous closed loop. However, as shown, the spacing between consecutive traces is maintained substantially constant except near the end of the slot. In the embodiment shown, the closed loop of each consecutive laser beam trace overlaps on each slot end. In this embodiment, there are 4 closed loops overlapping at each slot end. In alternative embodiments, there are at least 2 closed loops.

Various embodiments of slot profiles that combine steps, tapered walls, smooth walls, and counterbores are envisioned with the present invention.

In alternative embodiments or embodiments additional to the laser beam trace pattern, the stepped, tapered, smooth or otherwise varied slot walls of the embodiments shown in FIGS. 6A through 6L are formed by varying the laser process, trace, or laser beam source. There are several methods of varying the laser beam or the laser process that may be employed with embodiments of the present invention. Some of the methods include varying the laser beam diameter by moving the laser beam focus in a z-direction (towards or away from the substrate), and adjusting the UV laser machine. For example, the laser beam diameter may be varied using a beam expander. In a particular embodiment, the beam expander (telescope) is Galilean, where there is no internal focus that can lead to air break down with high energy pulsed lasers. Alternatively, Keplerian telescopes are used at lower energies. For more information on beam expanders that may be used with this invention, see http://www.mellesgriot.com/pdf/002.10-2.12.pdf. A scan speed, a pulse width, a repetition rate, focusing lens, laser power, etc., may be adjusted on the UV laser machine to vary the laser beam or laser process. For example, the laser power may be reduced at or near surface breakthrough to minimize damage, including chipping and cracking, to the substrate surface (especially for reducing damage to slot edges in the surface with active layers). In another example, the laser beam is defocused in order to clean the slot and the substrate.

Figure 8A:
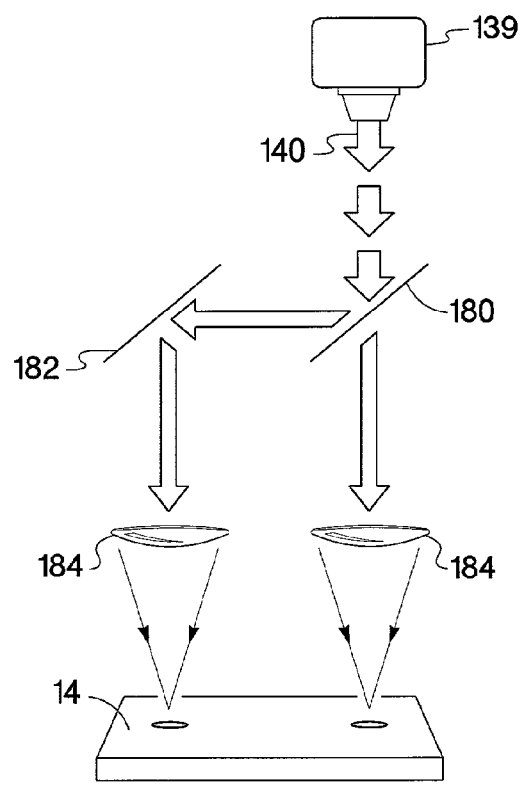
FIGS. 8A to 8B illustrate various embodiments of optical schemes for splitting the laser beam.
Figure 8B:
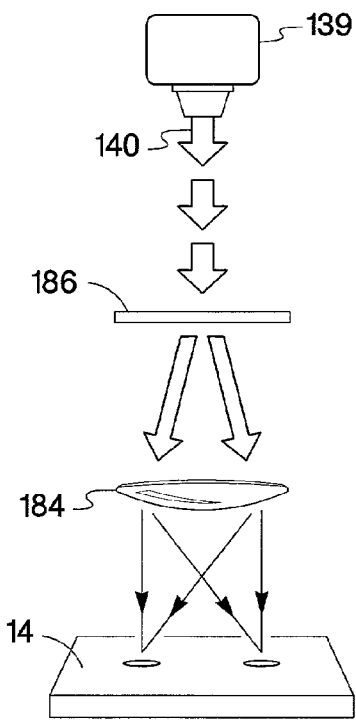

FIGS. 8A to 8B illustrate various embodiments of optical schemes for splitting the laser beam 140. In these illustrated embodiments, the laser beam 140 comes from the laser source 139. The high-energy pulse laser beam 140 is split into a number of beamlets such that the energy of each beamlet has optimum energy, and hence optimum etch depth. In the embodiments shown, increases in laser power are used to produce two beams with more optimal conditions. FIG. 8A illustrates splitting the beam using conventional optics, while FIG. 8B illustrates an alternative embodiment of splitting the beam using diffractive optics. Provided large enough optics are used, embodiments of the present invention are applicable to beams of any size. In other embodiments, more than two beams or beamlets having the optimum energy are envisioned with the present invention.

FIG. 8A illustrates the embodiment where the laser beam 140 hits a 50/50 beam splitter 180, where the beam splits into two beamlets. A first one of the beamlets continues in the same direction and, upon reaching a first focusing lens 184, is focused to the printhead 14 (or substrate) for laser machining the substrate. A second one of the beamlets is deflected in a perpendicular direction and the beamlet subsequently hits a mirror 182 and is deflected towards a second focusing lens 184 to be focused to the printhead (or substrate) adjacent the first of the beamlets. In this manner, two laser beams are able to machine two slots on a substrate simultaneously.

FIG. 8B illustrates splitting the beam using diffractive optics. FIG. 8B illustrates the embodiment where the laser beam 140 hits a diffractive element 186, where the beam splits into two beamlets. Each of the two beamlets continues in substantially the same direction towards the substrate to a focusing lens 184. The laser beamlets are then focused to slot areas or areas to be laser machined on the substrate or printhead 14. In this alternative manner, two laser beams are able to machine two slots or two areas on a substrate simultaneously.

Figures 9A, 9B:
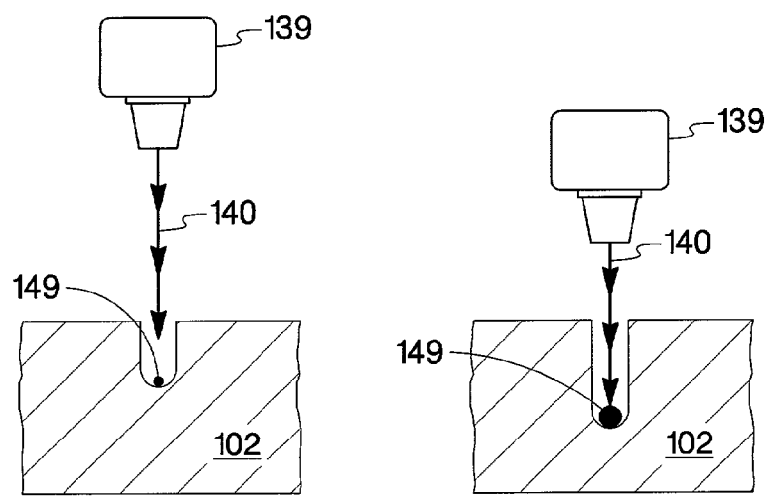
FIGS. 9A to 9B illustrate one embodiment of steps to move the laser beam in the z-direction.

FIGS. 9A to 9B illustrate one embodiment of steps to move the laser beam focal point in the z-direction. In this embodiment, the laser source 139 of the laser beam 140 is moved from a first position relative to the substrate 102, shown in FIG. 9A, to a closer position relative to the substrate 102, shown in FIG. 9B. In the embodiment shown, as the laser beam machines through the substrate and the etch depth increases, the distance between the laser source and the substrate being etched increases. Consequently, in the embodiment shown, the focus of the laser beam is altered non-optimally (due to beam attenuation) and/or the amount of debris 149 increases. As shown in the embodiment of FIG. 9B, if the laser source is moved with the depth etch, the focus of the laser beam remains substantially the same throughout. In an alternative embodiment, the laser beam focal point is adjusted with the increasing depth.

Figure 10A:
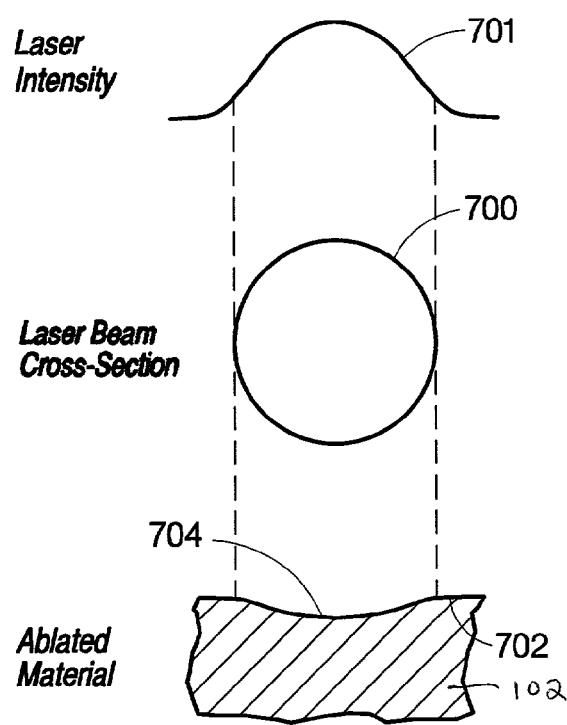
FIGS. 10A to 10B illustrate embodiments depicting laser beam power and ablated material for laser beam cross-sections.
Figure 10B:
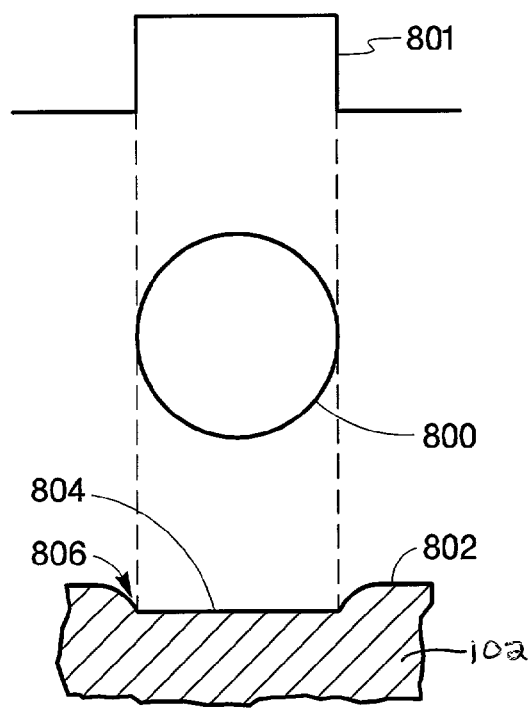

FIGS. 10A to 10B illustrate embodiments depicting laser beam power or intensity over a laser beam cross-section and the profile of the subsequently ablated material. FIG. 10A is an embodiment depicting a laser beam 700 with a Gaussian distribution of laser intensity. In FIG. 10A, a Gaussian laser power or intensity curve 701 over the beam cross-section is shown. The laser beam 700 contacts a surface 702 of the material substantially within the area marked by the dashed lines. In this embodiment, the laser beam 700 renders the ablated material with a curved surface 702. A central area 704 of the material is ablated to a larger degree than edge or periphery areas, due to the greater intensity of the laser beam in the center. In some embodiments, the curved surface 702 may not be optimum due to the uneven topology.

FIG. 10B illustrates an embodiment of a laser beam having uniform intensity for the laser beam power, or 'top hat' laser beams 800. In FIG. 10B, a uniform laser power or intensity curve 801 over the beam cross-section is shown. In this embodiment, the laser beam 800 contacts the surface 802 substantially within the dashed lines in FIG. 10B at surface 804. Even though the laser beam is not purposefully directed towards areas adjacent to surface 804, also known as edge or periphery areas 806, these areas 806 are affected in some embodiments. As shown in this embodiment, the laser beam 800 renders the ablated material with a substantially flat surface 804 in the area that the laser beam 800 directly contacts, and a curved surface along the periphery 806. Due to the uniform intensity of the laser beam substantially along the entire cross-section, the area 804 is substantially uniformly ablated, i.e. flat. In some embodiments, the uniform intensity beam is achieved using (a) a beam expanding telescope, mask and imaging lens, (b) Diffractive Optical Elements and/or (c) beam homogeniser units (such as segmented mirrors).

It is therefore to be understood that this invention may be practiced otherwise than as specifically described For example, the present invention is not limited to thermally actuated printheads, but may also include, for example, piezoelectric activated printheads, and other mechanically actuated printheads, as well as other applications having micro-fluidic channels through a substrate. Methods of forming micro-fluidic channels described above may also be applied to micro-electromechanical systems (MEMS) that include atomic resolution storage devices, fuel cells, sensors, and displays, for example. Thus, the present embodiments of the invention should be considered in all respects as illustrative and not restrictive, the scope of the invention to be indicated by the appended claims rather than the foregoing description. Where the claims recite "a" or "a first" element of the equivalent thereof, such claims should be understood to include incorporation of one or more such elements, neither requiring nor excluding two or more such elements.

What is claimed is:

1. A method of laser machining a fluid slot in a printhead comprising:

directing a UV laser beam towards a substrate with microelectronics; and forming the fluid slot through the substrate by laser-machining the substrate with the UV laser beam, including moving the UV laser beam along the substrate as the fluid slot is formed and tracing the UV laser beam in a pre-selected pattern on the substrate within a slot area as the fluid slot is formed, wherein tracing the UV laser beam in the pre-selected pattern includes tracing the UV laser beam on the substrate within the slot area in at least one of a serpentine pattern, a spiral pattern, an elliptical pattern, and a consecutive closed loops pattern.

2. The method of claim 1 wherein the substrate has a first surface with a first slot area and an opposite second surface with a second slot area, wherein the UV laser beam is directed towards the first and second slot areas of the substrate for bi-directional laser machining of the fluid slot through the substrate, and wherein the first surface has the microelectronics and the second surface is laser-machined before the first surface.

3. The method of claim 2 wherein a majority of the fluid slot is laser-machined from the second surface.

4. The method of claim 1 wherein forming the fluid slot through the substrate further includes varying a diameter of the UV laser beam while forming the fluid slot through the substrate.

5. The method of claim 1 wherein tracing the UV laser beam in the pre-selected pattern includes tracing the UV laser beam on the substrate within the slot area in the serpentine pattern, including tracing the UV laser beam back and forth within the slot area from one end of the fluid slot to an opposite end of the fluid slot.

6. The method of claim 1 wherein tracing the UV laser beam in the pre-selected pattern includes tracing the UV laser beam on the substrate within the slot area in the spiral pattern, including one of tracing the UV laser beam from a center of the slot area and moving the UV laser beam in a circular pattern increasing in size, and tracing the UV laser beam along an edge of the slot area and moving the UV laser beam in a circular pattern decreasing in size.

7. The method of claim 1 wherein tracing the UV laser beam in the pre-selected pattern includes tracing the UV laser beam on the substrate within the slot area in the elliptical pattern, including tracing the UV laser beam along an edge of the slot area.

8. The method of claim 1 wherein tracing the UV laser beam in the pre-selected pattern includes tracing the UV laser beam on the substrate within the slot area in the consecutive closed loops pattern, including one of tracing the UV laser beam in consecutive larger closed loops within the slot area, and tracing the UV laser beam in consecutive smaller closed loops within the slot area.

9. The method of claim 1 wherein tracing the UV laser beam in the pre-selected pattern includes tracing the UV laser beam on the substrate within the slot area in the serpentine pattern and the elliptical pattern, including tracing the UV laser beam back and forth within the slot area from one end of the fluid slot to an opposite end of the fluid slot and tracing the UV laser beam along an edge of the slot area.

10. A method of laser machining a fluid slot in a printhead comprising:
    directing a diode-pumped solid-state pulsed UV laser beam towards a substrate with microelectronics; and
    laser-machining the fluid slot through the substrate with the UV laser beam, including moving the UV laser beam along a surface of the substrate while laser-machining the fluid slot through the substrate and tracing the UV laser beam in a pre-selected pattern on the surface of the substrate within a slot area while laser-machining the fluid slot through the substrate,
    wherein tracing the UV laser beam in the pre-selected pattern includes tracing the UV laser beam on the surface of the substrate within the slot area in at least one of a serpentine pattern, a spiral pattern, an elliptical pattern, and a consecutive closed loops pattern.

11. The method of claim 10 further comprising:
    adjusting a laser beam focal point closer to the surface of the substrate after a portion of the substrate surface is laser-machined.

12. The method of claim 10 further comprising at least one of:
    reducing laser beam power near about surface breakthrough to minimize damage to the substrate surface; and
    defocusing the laser beam to clean the fluid slot.

13. The method of claim 10 wherein laser-machining the fluid slot through the substrate further includes varying a diameter of the UV laser beam while laser-machining the fluid slot through the substrate.

14. The method of claim 10 wherein tracing the UV laser beam in the pre-selected pattern includes tracing the UV laser beam on the surface of the substrate within the slot area in the serpentine pattern, including tracing the UV laser beam back and forth within the slot area from one end of the fluid slot to an opposite end of the fluid slot.

15. The method of claim 10 wherein tracing the UV laser beam in the pre-selected pattern includes tracing the UV laser beam on the surface of the substrate within the slot area in the spiral pattern, including one of tracing the UV laser beam from a center of the slot area and moving the UV laser beam in a circular pattern increasing in size, and tracing the UV laser beam along an edge of the slot area and moving the UV laser beam in a circular pattern decreasing in size.

16. The method of claim 10 wherein tracing the UV laser beam in the pre-selected pattern includes tracing the UV laser beam on the surface of the substrate within the slot area in the elliptical pattern, including tracing the UV laser beam along an edge of the slot area.

17. The method of claim 10 wherein tracing the UV laser beam in the pre-selected pattern includes tracing the UV laser beam on the surface of the substrate within the slot area in the consecutive closed loops pattern, including one of tracing the UV laser beam in consecutive larger closed loops within the slot area, and tracing the UV laser beam in consecutive smaller closed loops within the slot area.

18. The method of claim 10 wherein tracing the UV laser beam in the pre-selected pattern includes tracing the UV laser beam on the surface of the substrate within the slot area in the serpentine pattern and the elliptical pattern, including tracing the UV laser beam back and forth within the slot area from one end of the fluid slot to an opposite end of the fluid slot and tracing the UV laser beam along an edge of the slot area.

19. A method of laser machining a fluid slot in a printhead comprising directing a diode-pumped solid-state pulsed UV laser beam towards a substrate with microelectronics to form fluid slots through the substrate,
    wherein the substrate has a first surface with at least two spaced slot areas defined on the first surface, wherein the at least two spaced slot areas are laser-machined simultaneously from a single laser source by moving the UV laser beam along the first surface of the substrate as the substrate is laser-machined and tracing the UV laser beam in pre-selected patterns on the first surface of the substrate within the at least two spaced slot areas as the substrate is laser-machined.

20. The method of claim 19 wherein the at least two spaced slot areas are laser-machined simultaneously using at least one of a diffractive element and a beam splitter.

21. The method of claim 19 wherein tracing the UV laser beam in the pre-selected patterns includes tracing the UV laser beam in at least one of a raster pattern, a serpentine pattern, a spiral pattern, an elliptical pattern, concentric elliptical patterns, and a window pattern.

22. The method of claim 19 wherein the fluid slots are further formed by varying a diameter of the UV laser beam while forming the fluid slots through the substrate.

23. A method of laser machining a fluid channel in a printhead comprising:
    forming fluid channels in a substrate with microelectronics, wherein the substrate has a first surface, a second opposite surface, and at least two spaced channel areas defined on each of the first and second surfaces, wherein the at least two spaced channel areas of the first surface correspond to the at least two spaced channel areas of the second surface, wherein forming the fluid channels comprises:
    laser-machining the at least two spaced channel areas on the first surface simultaneously with a UV laser beam by moving the UV laser beam along the first surface of the substrate as the substrate is laser-machined and the fluid channels are formed and tracing the UV laser beam in pre-selected patterns on the first surface of the substrate within the at least two spaced channel areas as the substrate is laser-machined and the fluid channels are formed; and
    laser-machining the at least two spaced channel areas on the second surface simultaneously.

24. The method of claim 23 wherein tracing the UV laser beam in the pre-selected patterns include tracing the UV laser beam in at least one of a raster pattern, a serpentine pattern, a spiral pattern, an elliptical pattern, concentric elliptical patterns, and a window pattern.

25. The method of claim 23 wherein forming the fluid channels further comprises varying a diameter of the UV laser beam while forming the fluid channels in the substrate.

* * * * *